United States Patent [19]

Browning

[11] 4,373,820

[45] Feb. 15, 1983

[54] APPARATUS FOR MIXING RECLAIMED AND VIRGIN POWDER FOR USE IN SPRAY BOOTHS

[76] Inventor: Jesse Browning, 4217 Via Pinzon, Palos Verdes Estates, Calif. 90274

[21] Appl. No.: 244,716

[22] Filed: Mar. 17, 1981

[51] Int. Cl.³ .................... B01F 13/02; G05D 11/02; B01F 13/00
[52] U.S. Cl. .................................. 366/101; 366/151; 366/341
[58] Field of Search ............... 366/101, 151, 152, 153, 366/160, 177, 193, 341, 17, 21

[56] References Cited

U.S. PATENT DOCUMENTS

| | | | |
|---|---|---|---|
| 1,911,575 | 5/1933 | Lee | 366/182 |
| 1,948,401 | 2/1934 | Smith | 366/177 X |
| 3,047,275 | 7/1962 | Cox | 366/101 |
| 4,002,325 | 1/1977 | Herfeld | 366/101 |

Primary Examiner—Edward J. McCarthy
Attorney, Agent, or Firm—Blakely, Sokoloff, Taylor & Zafman

[57] ABSTRACT

A mixing apparatus for use in conjunction with powder spray paint booths whereby reclaimed powder overspray is automatically mixed with virgin powder in the proper proportions and supplied to the spray gun. Provision is made for quick disconnect and easy change of color of powder.

20 Claims, 3 Drawing Figures

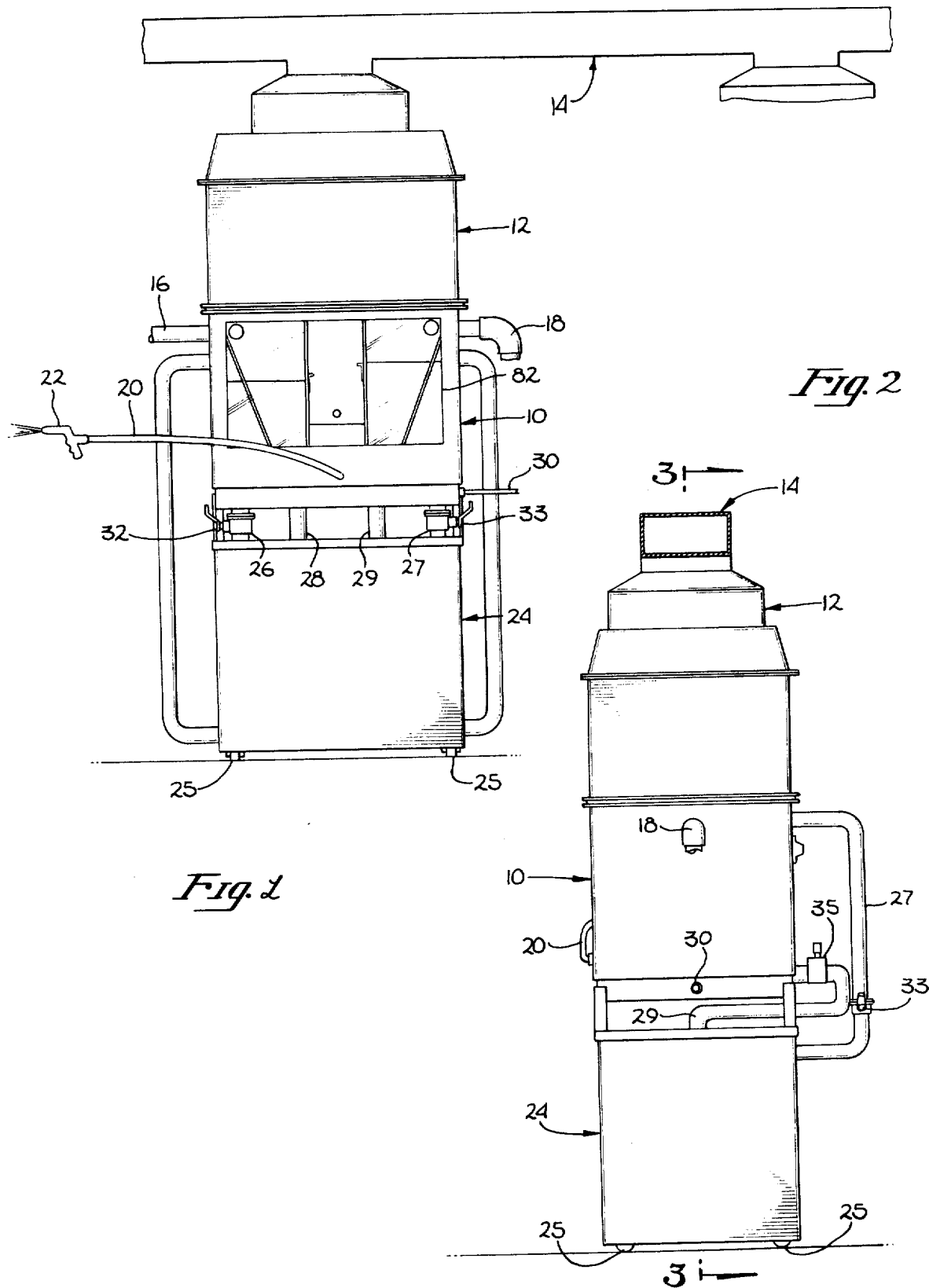

APPARATUS FOR MIXING RECLAIMED AND VIRGIN POWDER FOR USE IN SPRAY BOOTHS

PRIOR ART STATEMENT

Applicant is not aware of any devices for automatically mixing reclaimed powder with virgin powder in the proper proportions to permit the reclaimed powder to be used and produce a satisfactory, non-grainy coat of paint. To applicant's knowledge all such mixing is currently performed externally of the source of powder supplied to a spray gun and then poured into the container which supplies the powder to the gun. No novelty search has been conducted.

SUMMARY OF THE INVENTION

Collection of the oversprayed powder from powder spray paint booths in a common practice. When the collected powder is reused the resulting coat of paint will be grainy. A satisfactory coat of paint may be produced by first mixing the reclaimed powder with virgin powder. The invention comprises an apparatus for automatically mixing the reclaimed powder with the virgin powder and supplying that mixed powder to the paint spray gun. A first chamber is provided for filtering and holding the reclaimed powder in a fluidized state. A second chamber is providing for filtering and holding the virgin powder in a fluidized state. The first and second chambers each communicate with a third chamber through respective variably, controlled apertures. By controlling the size of the variably controlled apertures, the proportion of reclaimed to virgin powder mixed within the third chamber is controlled. The powder mixture in the third chamber is supplied to the powder spray gun.

A roll-away reservoir cart is also provided. The cart has two separate chambers, one of which communicates with the above described first chamber of reclaimed powder and the other of which communicates with the above described second chamber of virgin powder. Appropriate valving is provided to permit the contents of the first chamber to be flushed into the one chamber of the cart and to permit the contents of the second chamber to be flushed into the other chamber of the cart. The flushing and use of a roll-away reservoir cart permit easy cleaning of the device and rapid changing of color of the powder paint without contamination of the new color of powder.

DESCRIPTION OF THE FIGURES

FIG. 1 is an external front plan view of the mixing device.
FIG. 2 is a side plan view of the mixing device.

DETAILED DESCRIPTION

Figure 3:
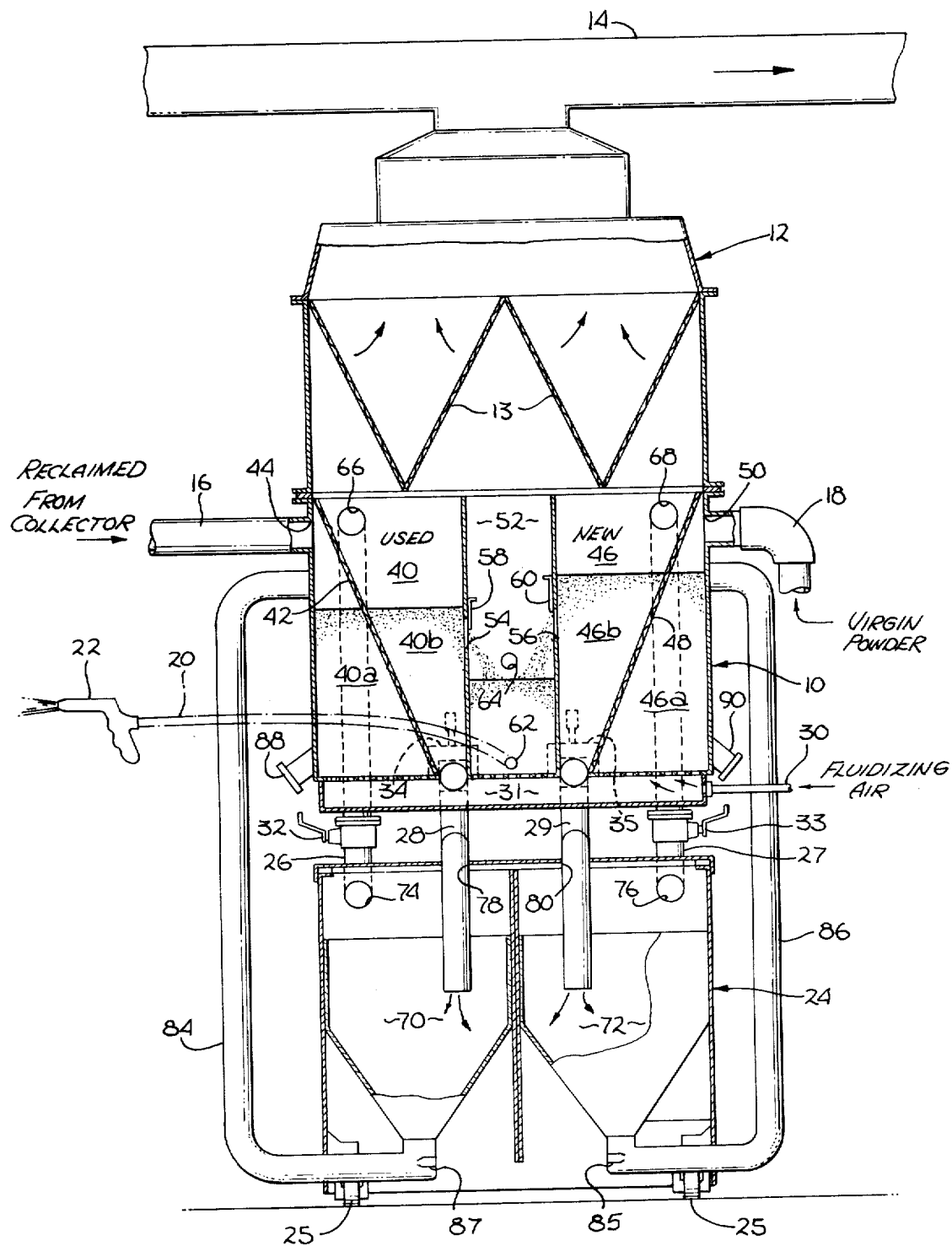
FIG. 3 is a cross-section of the mixing device.

A common process used to spray paint a wide variety of objects is to spray the objects with a dry powdered paint. Such a process produces a substantial amount of oversprayed powder. It is ecologically and economically desirable to reclaim this oversprayed powder and recycle it for painting other items. In this prior art, if an object is spray painted with 100% of such reclaimed powder, the resulting coat of paint is unacceptably grainy. The grainy quality may be reduced and/or eliminated by mixing the reclaimed powder with a quantity of virgin powder. An acceptable coat of paint is achieved by mixing 1 part reclaimed powder to 2 parts virgin powder. Such mixing may be done at a location remote from the paint spray booth then poured into the powder supply of the spray gun. Utilizing the present invention, this mixing may be accomplished automatically and at a location conveniently near the spray booth.

A mixing unit 10 may be suitably affixed for communication with an exhaust hood 12 and an exhaust duct 14 as shown in FIG. 1. Hose 16 which is connected to one side of the mixing unit 10 conveys reclaimed powder to the interior of the mixing unit and a hose 18 which is connected to the side of the mixing unit opposite to hose 16 conveys virgin powder to the interior of the mixing unit 10. Within mixing unit 10, the desired proportions of reclaimed powder and virgin powder are mixed and supplied via a hose 20 to a spray gun 22.

Mixing unit 10 communicates with a powder reservoir 24 which, as shown in FIG. 1, is conveniently mounted upon wheels 25. The reservoir 24 can thus be conveniently rolled in and out of the area under the mixing unit 10. Further, because the reservoir 24 is mounted on wheels 25, powder color changes may be easily and quickly effected as explained more fully below.

If the level of reclaimed powder within mixing unit 10 rises too high, the excess powder will flow through over flow pipe 26 into the reservoir 24. Likewise, if the level of virgin powder within mixing unit 10 rises too high, the excess powder will flow through overflow pipe 27 into reservoir 24. To effect rapid color changing, the contents of the mixing unit 10 can be rapidly dumped into the reservoir 24 by means of dump lines 28 and 29. The powder within mixing unit 10 is kept in a fluidized state to facilitate flow and mixing, by a fluidizing device which supplies pressurized air through line 30. During normal operation, dump valves 34 and 35 are closed to retain the powder within the mixing unit 10. To change the color of the powder, dump valves 34 and 35 are opened and three way valves 32 and 33 are vented to the atmosphere to urge the fluidized powders to flow through the dump lines 28 and 29 into the reservoir 24.

The operation of the invention will be discussed in relation to the detailed cross sectional view of FIG. 3. Inlet hose 16 communicates with a supply of reclaimed powder from a powder paint spray booth. This supply of reclaimed powder is maintained in a fluidized state to facilitate its flow. Inlet hose 18 communicates with a supply of virgin powder which is also maintained in a fluidized state. These powders are drawn into the mixing unit 10 by the low pressure within the mixing unit 10 which is induced as a result of the low pressure in the exhaust duct 14. The low pressure in the exhaust duct 14 can be provided by a typical exhaust fan or other suitable exhaust device. The low pressure in the hood 12 which may include filter units 13 draws the reclaimed powder through inlet hose 16 and virgin powder through inlet hose 18.

The mixing unit 10 is further divided into three chambers. The first chamber, or reclaimed powder chamber 40, is divided into two sections 40a and 40b which are separated by a filter 42. The reclaimed powder travels along hose 16 and enters chamber 40 through an aperture 44 located in section 40a on the first side of filter 42. The reclaimed powder falls to the bottom of section 40a where it is maintained in a fluidized state by a fluidizing means 31. The low pressure in the exhaust duct 14 causes the pressure in section 40b to be lower than the pressure in section 40a. As a result fluidized reclaimed powder is drawn through the filter 42, which removes the large impurities in the powder into section 40b. The fluidized reclaimed powder to seeks the same level in sections 40a and 40b.

The second chamber, or virgin powder chamber 46, is similarly divided into two sections 46a and 46b which are separated by a filter 48. The virgin powder travels along hose 18 and enters chamber 46 through an aperture 50 located in section 46a on the first side of filter 48. The virgin powder falls to the bottom of section 46a where it is maintained in a fluidized state by the fluidizing means 31. The low pressure in the exhaust duct 14 causes the pressure in section 46b to be lower than the pressure in section 46a. As a result, the fluidized virgin powder is drawn through the filter 48, which removes impurities, and into section 46b. The fluidized virgin powder will seek the same level in sections 46a and 46b.

The third chamber, mixing chamber 52, communicates with section 40b of the first chamber 40 through an aperture 54 and with section 46b of the second chamber 46 through an aperture 56. The size of apertures 54 and 56 are manually adjustable by moving slide gates 58 and 60 back and forth. By adjusting the gates 58 and 60, the ratio of the flow rate of reclaimed powder into mixing chamber 52 to the flow rate of virgin powder into chamber 52 is controlled. As the virgin and reclaimed powder enter mixing chamber 52 they fall to the bottom of chamber 52 where they are maintained in a mixed and fluidized state by the fluidizing means 31. Chamber 52 communicates through the aperture 62 with hose 20 whereby the mixture of reclaimed and virgin powder is supplied to spray gun 22.

If the spray gun 22 has not been used for some period of time, or has been operated at low flow rates, the level of fluidized mixed powder in mixing chamber 52 will rise. The level of mixed powder should not be allowed to rise to the level of the apertures 54 or 56 to prevent reverse flow through those apertures. In order to prevent this reverse flow, a sensor 64 is positioned on one of the walls of chamber 52, slightly below apertures 54 and 56. When the level of mixed powder reaches the level of the sensor 64, a control signal closes apertures 54 and 56. The spray gun 22 will resume spraying when it has drawn enough mixed powder out of chamber 52, so that the level of powder will be below the level of sensor 64, and the sensor 64 will cause the apertures 54 and 56 to reopen.

During the time that apertures 54 and 56 are closed, or at any time that the powder flowing into reclaimed powder chamber 40 or virgin powder chamber 46, rises to the level of apertures 54 and 56 such that they close, the powders will pass out of chambers 40 and 46 through apertures 66 and 68 respectively into overflow pipes 26 and 27. Assuming that three way valves 32 and 33 are open, the powders will then flow into their respective chambers 70 and 72 in the reservoir cart 24.

The reservoir cart 24 comprises a first reservoir 70 which contains the reclaimed powder and a second reservoir 72 which contains the virgin powder. Reservoirs 70 and 72 are attached to the dump lines 28 and 29, respectively, through apertures 78 and 80 provided in the top of reservoir cart 24. Powder from the mixing unit flows through these apertures 78 and 80 into reservoirs 70 and 72 respectively, when the color of the powdered paint is changed to another color.

When the color of paint is changed the reservoir cart 24 must be replaced with a new reservoir cart 24 having a supply of reclaimed powder of the new color in reservoir 70 and a supply of virgin powder of the same new color in reservoir 72.

Any further flow of the virgin powder through hose 18 is stopped by closing a valve (not shown) in hose 18. Also, the apertures 54 and 56 are closed to prevent further entry of the powder into chamber 52. Chamber 52 is emptied by spraying the mixed powder back into the spray booth through spray gun 22 for reclaimation. The reclaimed powder passes through hose 16 into chamber 40a. After chamber 52 has been emptied (which can be observed by an operator through a plexiglass window 82 located on the front of mixing unit 10) and the flow of reclaimed powder into chamber 40a has essentially stopped, the exhaust fans in duct 14 are turned off. Three way valves 32 and 33 are vented to the atmosphere utilizing the high pressure air until flowing through line 30 from the fluidizing means to vent chambers 40 and 46 and reservoirs 70 and 72 until the pressure in the mixing unit and reservoirs are at atmospheric pressure. Valves 34 and 35 are then opened. The high pressure air from line 30 pushes the fluidized powders through dump lines 28 and 29 into their respective reservoirs 70 and 72. The dumping of the powders continues until both of the mixing chambers 40 and 46 are empty. At this point all of the powders, are in roll away reservoir cart 24. Another method for voiding the mixing chamber 52 is providing chamber 52 with its own three way valve and dump line communicating with reservoir 70, like those of chamber 40 such that when the three-way valve is open the powders will immediately fall into their respective reservoirs.

When chambers 40, 46 and 52 have been emptied into the appropriate reservoir 70 or 72, all lines, pipes and other connections between mixing unit 10 and reservoir cart 24 are disconnected at a quick disconnect means (not shown). Cart 24 is rolled away and a new cart 24 having a supply of the new reclaimed powder in reservoir 70 and a supply of the new virgin powder in reservoir 72 is rolled under mixing unit 10. All pipes lines and hoses between the reservoir cart and the mixing unit are appropriately connected. Inlet hose 18 is connected to the new source of virgin powder, and the valve (not shown) in line 18 is opened.

Before the spray gun 22 can spray the new colored powder, the empty mixing unit 10 is filled with powder in chambers 40, 46 and 52. To fill these chambers, dump valves 34 and 35 are closed and overflow valves 32 and 33 open to cause the top of reservoirs 70 and 72 to achieve atmospheric pressure. Apertures 54 and 56 are then reset to their open position. The fans in exhaust duct 14 are turned on which produces a low pressure within chambers 40, 46 and 52. The pressure differential between chamber 40 and reservoir 70 causes the new reclaimed powder to flow out of reservoir 70 through charging tube 84 into chamber 40 where it is fluidized. Similarly, the pressure differential between in chamber 46 reservoir 72 causes the virgin powder of the new color out of reservoir 72 through charging tube 86 into chamber 46 where it is fluidized. High pressure air injection nozzles 85 and 87 are provided at the bottom of the charging tubes to direct the high pressure air and powder up the tubes. The powders rise in chambers 40 and 46 to the level of the now open apertures 54 and 56 and powder flows into chamber 52 automatically in the proper proportions. As the powders in chamber 52 are fluidized, the level of mixed powder will rise. When the levels of powder in chambers 40, 46 and 52 have risen to an acceptable working level, (which may be determined by viewing through plexiglass window 82) the three way valves 32 and 33 are opened to reset the overflow pipes 26 and 27 for proper functioning. The injection nozzles 85 and 87 are turned off and powder ceases to travel up charging tubes 84 and 86. The apparatus is now ready to begin spray painting with a new color of powder.

On occasion, it may be desirable to give chambers 40 and 46, especially the bottoms of the chambers, a thorough cleansing. To facilitate such cleansing access ports, 88 and 90 respectively, are provided near the bottom of the chambers.

When spray painting with a mixture of reclaimed and virgin powder, the critical limitation is selecting the correct concentration of reclaimed powder in the mixture. In the preferred embodiment, the reclaimed powder is about 33⅓% of the total mixture. When the powder contained in the mixing chamber 52 is voided into the reservoir 70 of reclaimed powder there will be some virgin powder emptied into the reclaimed reservoir powder. This effectively *reduces* the concentration of reclaimed powder in reservoir 70 and is not critical. Such contamination only improves the quality of the resulting coat of paint.

While the invention has been described above with reference to FIGS. 1 through 3, those figures and the description are for purposes of illustration only and should not be interpreted as limiting the invention disclosed herein. It should be appreciated that various changes in structure and material, and modifications of function can be readily implemented by one of ordinary skill in the art without departing from the spirit and scope of the present invention as defined in the appended claims.

I claim:

1. An automatic mixing device comprising:
   a first chamber having a first aperture in communication with a source of reclaimed powder;
   a second chamber having a second aperture in communication with a source of virgin powder;
   a means for transporting said reclaimed powder to said first chamber and said virgin powder to said second chamber;
   a third chamber having a third aperture in communication with said first chamber, a fourth aperture in communication with said second chamber, and a fifth aperture in communication with a powder spray gun;
   a means for fluidizing powder in said first, second and third chambers;
   control means for adjusting the area of said third and said fourth apertures whereby the rate of flow of reclaimed powder flowing from said first chamber through said third aperture into said third chamber bears a controllable ratio to the flow rate of virgin powder flowing from said second chamber through said fourth aperture into said third chamber;
   whereby said powder spray gun is provided through said fifth aperture with a powder mixture comprising controlled proportions of reclaimed and virgin powder.

2. The apparatus according to claim 1 wherein said third chamber further is provided with a sensor means for initiating closure of said third and fourth apertures upon detection that powder in said third chamber has risen to a preselected level at or below the level of said third and fourth apertures.

3. The apparatus according to claim 1 wherein said first chamber is provided with a filter so positioned that reclaimed powder entering said first chamber must pass through said filter before exiting said first chamber;
   and said second chamber is provided with a filter so positioned that virgin powder entering said second chamber must pass through said filter before exiting said second chamber.

4. The apparatus according to claim 1 further comprising:
   a storage means comprising at least a first reservoir and a second reservoir for receiving powder from said first chamber and said second chamber respectively;
   first overflow means communicating between said first reservoir and said first chamber;
   second overflow means communicating between said second reservoir and said second chamber;
   whereby if the level of powder in said first or second chamber rises to a preselected level said powder will enter said respective overflow means, pass through said respective overflow means, and enter said first or second reservoir means respectively.

5. The apparatus according to claim 4 wherein said first overflow means comprises a first overflow pipe and a first three way valve intermediate the ends thereof; and
   said second overflow means comprises a second overflow pipe and a second three way valve intermediate the ends thereof.

6. The apparatus according to claim 5 further comprising:
   a first dumping means for moving powder from said first chamber to said first reservoir; and
   a second dumping means for moving powder from said second chamber to said second reservoir.

7. The apparatus according to claim 6 wherein said first dumping means comprises a first dumping line and a first dumping valve for controlling flow of powder through said first dumping line, said first dumping line communicating with said first chamber near the bottom of said first chamber;
   and said second dumping means comprises a second dumping line and a second dumping valve for controlling flow of powder through said second dumping line, said second dumping line communicating with said second chamber near the bottom of said second chamber.

8. The apparatus according to claim 6 further comprising:
   a first filling means for moving powder from said first reservoir to said first chamber;
   a second filling means for moving powder from said second reservoir to said second chamber.

9. The apparatus according to claim 8 wherein said first filling means comprises a first charging tube and said second filling means comprises a second charging tube.

10. The apparatus according to claim 9 wherein each of said charging tubes communicates with its respective reservoir near the bottom thereof and, communicates with its respective chamber near the top thereof.

11. The apparatus according to claim 9 wherein each said filling means further comprises a means for providing air under pressure to the interior of said charging means to assist in moving powder from each respective reservoir to each respective chamber.

12. The apparatus according to claim 9 wherein each of said first and second three way valves may be vented to the atmosphere to assist in the movement of powder through said respective charging tubes.

13. An automatic mixing apparatus, comprising:
a first source of a first powder;
a second source of a second powder;
a mixing chamber comprising, a sensor for detecting whether said powders in said mixing chamber have reached a preselected level, said mixing chamber being connected to an outlet and said first and second sources,
first means connected to the mixing chamber for controlling the rate of flow of said first powder from said first source,
second means connected to the second side of said mixing chamber for controlling the rate of flow of said second powder from said second source,
means for mixing said first and second powders flowing into said mixing chamber such that said outlet contains a powder comprising a preselected ratio of said first powder to said second powder,
whereby when said powder reach said preselected level, said sensor will close off the connection between said mixing chamber and said first and second sources.

14. The apparatus according to claim 13 wherein said mixing means comprises fluidizing means for fluidizing said powders within said mixing chamber.

15. The apparatus according to claim 13 wherein said preselected ratio is set to be not more than about 33 percent of said first powder to not less than about 67 percent of said second powder.

16. An automatic powdered paint mixing apparatus comprising:
a mixing unit connected to a source of reclaimed powder and connected to a source of virgin powder;
a reservoir unit comprising (1) a first reservoir connected to said mixing unit, near the top thereof, through a first overplow pipe for directing overflowing reclaimed powder to said first reservoir, and connected to the bottom of said mixing unit, though a first dump line, for controllably transferring reclaimed powder to said first reservoir; and (2) a second reservoir connected to said mixing unit, near the top thereof, through a second overflow pipe for directing overflowing virgin powder to said second reservoir, and connected to the bottom of said mixing unit, through a second dump line, for controllably transferring virgin powder to said second reservoir;
first and second filling means connected respectively between the bottom of said first and second reservoir and mixing unit, for moving reclaimed powder and virgin powder respectively, into said mixing unit from said respective first and second reservoirs;
said first and second overflow pipes and said first and second dump lines and said first and second filling means being easily decoupled from said reservoir unit; and
said reservoir unit being mounted on wheels whereby said reservoir unit is quickly and easily replaceable by an identical reservoir unit containing powder of a different color, thereby permitting a rapid change of color of said powders.

17. The automatic mixing apparatus of claim 13, wherein said mixing chamber further comprises a first, second and third chamber, said first chamber being connected to said first source for receiving said first powder, said second chamber connected to said second source for receiving said second powder, and said third chamber containing said mixed powder.

18. The apparatus of claim 13 further comprising reservoir means for receiving powder from said mixing chamber when the powder in said mixing chamber reaches said preselected level.

19. The apparatus of claim 17, further comprising first and second reservoir means for receiving powder from said first and second chambers respectively,
whereby if the level of powder in said first or second chamber rises to said preselected level said powder will enter said first or second reservoir means respectively.

20. The apparatus of claim 19, further comprising:
first overflow means communicating between said first reservoir and said first chamber;
second overflow means communicating between said second reservoir and said second chamber;
whereby if the level of powder in said first or second chamber rises to a preselected level said powder will enter said respective overflow means, pass through said respective overflow means, and enter said first or second reservoir means respectively.

* * * * *